United States Patent
Chen et al.

(10) Patent No.: US 10,850,446 B2
(45) Date of Patent: Dec. 1, 2020

(54) THREE-DIMENSIONAL (3D) PRINTING WITH EPOXY MOLD COMPOUND

(71) Applicant: Hewlett-Packard Development Company, L.P., Houston, TX (US)

(72) Inventors: Chien-Hua Chen, Corvallis, OR (US); Qin Liu, Corvallis, OR (US); Michael G. Monroe, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 235 days.

(21) Appl. No.: 16/073,181

(22) PCT Filed: Apr. 20, 2016

(86) PCT No.: PCT/US2016/028520
§ 371 (c)(1),
(2) Date: Jul. 26, 2018

(87) PCT Pub. No.: WO2017/184136
PCT Pub. Date: Oct. 26, 2017

(65) Prior Publication Data
US 2019/0030799 A1    Jan. 31, 2019

(51) Int. Cl.
| | |
|---|---|
| *B29C 64/165* | (2017.01) |
| *B33Y 10/00* | (2015.01) |
| *B33Y 70/00* | (2020.01) |
| *B33Y 30/00* | (2015.01) |
| *B29C 64/393* | (2017.01) |
| *B29K 63/00* | (2006.01) |

(52) U.S. Cl.
CPC .......... *B29C 64/165* (2017.08); *B29C 64/393* (2017.08); *B33Y 10/00* (2014.12); *B33Y 30/00* (2014.12); *B33Y 70/00* (2014.12); *B29K 2063/00* (2013.01)

(58) Field of Classification Search
None
See application file for complete search history.

(56) References Cited

U.S. PATENT DOCUMENTS

| | | |
|---|---|---|
| 7,365,129 B2 | 4/2008 | Kramer et al. |
| 9,156,999 B2 | 10/2015 | Ng et al. |
| 2004/0175686 A1 | 9/2004 | Ono et al. |

(Continued)

FOREIGN PATENT DOCUMENTS

| | | |
|---|---|---|
| CN | 103205107 | 7/2013 |
| CN | 104802406 | 7/2015 |

(Continued)

OTHER PUBLICATIONS

Alesta Powder Coatings—Technical Information Sheet—Mar. 17, 1998.

(Continued)

*Primary Examiner* — Mary Lynn F Theisen
(74) *Attorney, Agent, or Firm* — Dierker & Kavanaugh PC

(57) ABSTRACT

In a three-dimensional printing method example, an epoxy mold compound build material is applied. A fusing agent is selectively applied on at least a portion of the epoxy mold compound build material. The epoxy mold compound build material is exposed to energy, thereby fusing the portion of the epoxy mold compound build material in contact with the fusing agent to form a layer.

19 Claims, 2 Drawing Sheets

(56) References Cited

U.S. PATENT DOCUMENTS

| | | |
|---|---|---|
| 2005/0049739 A1 | 3/2005 | Kramer et al. |
| 2005/0093208 A1 | 5/2005 | Boyd et al. |
| 2007/0197692 A1* | 8/2007 | Monsheimer ........... C08L 67/02 |
| | | 524/80 |
| 2007/0241482 A1* | 10/2007 | Giller ................... G03G 15/224 |
| | | 264/494 |
| 2013/0326878 A1 | 12/2013 | Boehm et al. |
| 2014/0131908 A1 | 5/2014 | Sun et al. |

FOREIGN PATENT DOCUMENTS

| | | |
|---|---|---|
| EP | 1498277 | 1/2005 |
| WO | WO-2007114895 A2 | 10/2007 |
| WO | WO2007117636 A2 | 10/2007 |
| WO | WO-2015167520 A1 | 11/2015 |
| WO | WO2016/048357 | 3/2016 |

OTHER PUBLICATIONS

Bai Jicheng et al. Special Machining Technique, Jan. 2015, p. 290, Harbin University of Technology Press, China.
Lu Bingheng, RP Technology and Rapid Tooling, Mar. 1998, p. 107, Shaanxi Science and Technology Press, China.

* cited by examiner

THREE-DIMENSIONAL (3D) PRINTING WITH EPOXY MOLD COMPOUND

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method and the 3D printing system disclosed herein utilize Multi Jet Fusion (MJF). During multi jet fusion, an entire layer of a build material (also referred to as build material particles) is exposed to energy, but a selected region (in some instances less than the entire layer) of the build material is fused and hardened to become a layer of a 3D part. In the examples disclosed herein, a fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

Epoxy mold (molding) compounds are typically solid epoxy polymers, which can be heated to form a liquid that can be molded. Epoxy mold compounds can be used in high temperatures, as well as in corrosive and harsh environments (e.g., automotive applications). Epoxy mold compounds may also be tailored to meet different fatigue resistance, elasticity, thermal conductance, and/or operating temperature requirements. Traditionally, the use of epoxy mold compounds is for the protection of electronics and requires a mold chest and a lead frame.

Examples of the 3D printing method and 3D printing system disclosed herein utilize an epoxy mold compound (EMC) as the build material. This use of EMC build material allows for the creation of 3D parts that may be used in high temperatures and/or corrosive or harsh environments, and may also be used in electronics without a mold chest and a lead frame. The 3D parts formed from the EMC build material may also be tailored to meet different fatigue resistance, elasticity, thermal conductance, and/or operating temperature requirements. For example, the EMC build material may include silica filler, and the higher the amount of silica, the lower the coefficient of thermal expansion. For another example, the EMC build material may include alumina filler, which improves the thermal conductance of the EMC build material (e.g., when compared to the EMC build material containing silica). For still another example, the EMC build material may include a silicon flexibilizer can be added to render the EMC build material more elastic.

As used herein, the terms "3D printed part," "3D part," or "part" may be a completed 3D printed part or a layer of a 3D printed part.

Figure 1:
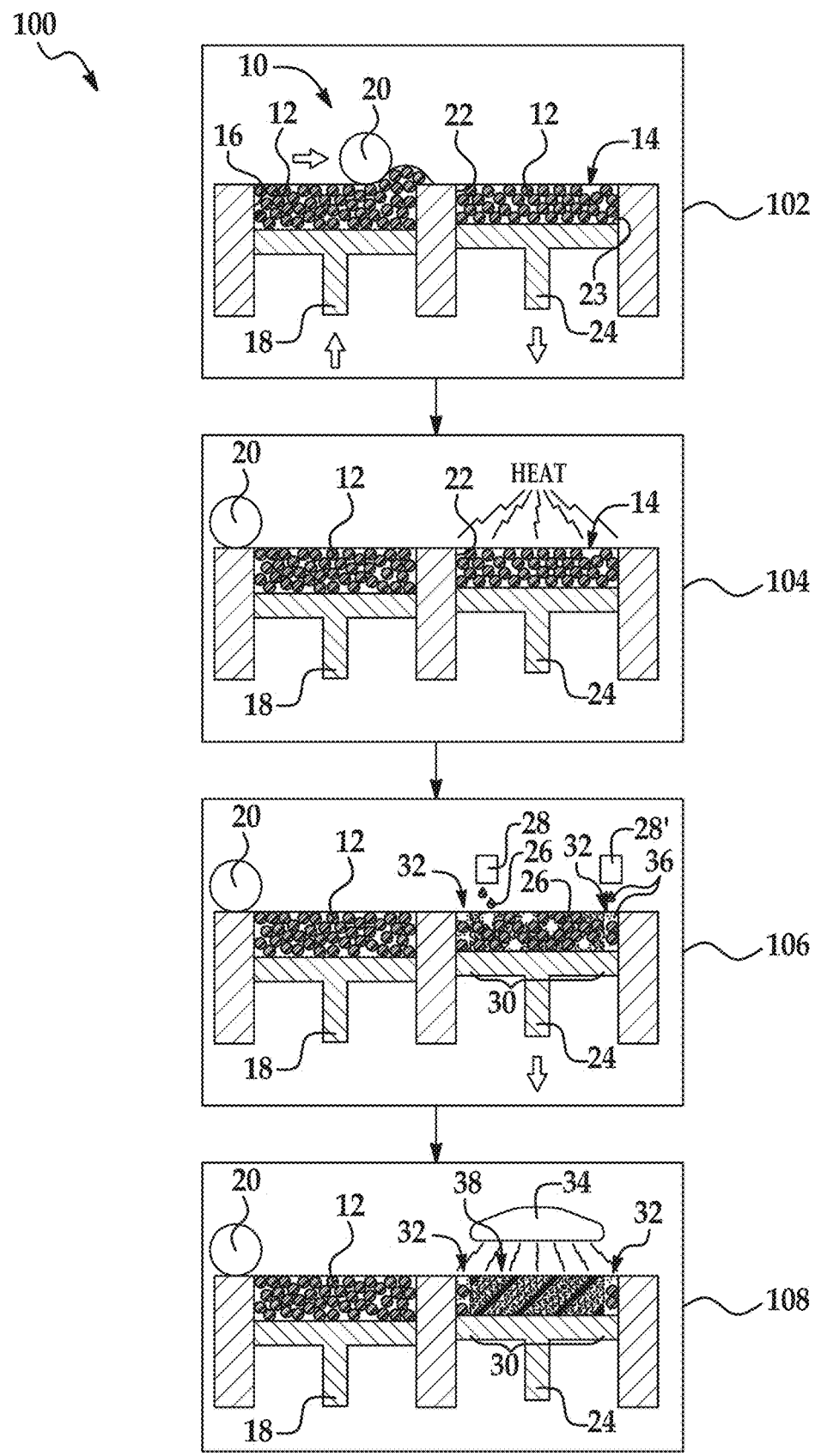
FIG. 1 is a flow diagram illustrating examples of a 3D printing method disclosed herein.

An example of the 3D printing method 100 is depicted in FIG. 1.

As shown at reference numeral 102, the method 100 includes applying an epoxy mold compound (EMC) build material 12. One layer 14 of the EMC build material 12 has been applied.

The EMC build material 12 is a one part thermal set or thermal cure epoxy. The EMC build material 12 does not require a hardener or curing agent to set/cure/fuse, but rather sets/cures/fuses upon exposure to sufficient heat (e.g., ranging from about 100° C. to about 130° C.).

The EMC build material 12 may be a powder. In one example, the EMC build material 12 is a white powder. In other examples, the EMC build material 12 may be a color other than white, as long as the build material is light reflecting or non-absorbing of the light/heat used for setting/curing/fusing the build material.

The EMC build material 12 may include a melting epoxy resin and a non-melting filler. In some examples, the EMC build material 12 consists of these components with no other components. In other examples, the EMC build material 12 may include a catalyst, a mold release agent, a colorant, a flame retardant, an adhesion promoter, a stress reliever, or combinations thereof.

In an example, the EMC build material 12 has a ratio of melting epoxy resin to non-melting filler ranges from about 1 to about 10. Some examples of the melting epoxy resin include diglycidyl ethers of bisphenol A (DGEBA) or bisphenol F (DGEBF), phenolic or cresol novolacs, and cycloaliphatic epoxides.

Examples of the non-melting filler include silica, alumina, alumina nitride, quartz, or combinations thereof. The non-melting filler may have a particle size ranging from about 10 µm to about 70 µm.

As mentioned above, the EMC build material 12 may include, in addition to the melting epoxy resin and the non-melting filler, a catalyst. The catalyst may accelerate the cure reaction. Examples of suitable catalysts include varieties of phosphorous, amine, or imidazole chemistries. One example of a phosphorous catalyst includes tetra-n-butyl-phosphonium bromide (TBPB). The amount of the catalyst present in the EMC build material 12 may range from about 0.2 wt % to about 2 wt % based on the total wt % of the EMC build material 12.

The EMC build material 12 may also include a mold release agent. The mold release agent may be included in epoxy mold compounds to facilitate the release of the EMC build material and the resulting part from the processing equipment (e.g., the fabrication bed 22). Examples of the mold release agent include waxes (e.g., hydrocarbon waxes), silicones, sodium dodecyl sulfate (SDS) soap, and fatty acids. The mold release agent may be present in the EMC build material 12 in an amount ranging from about 0 wt % to about 1 wt % of the total wt % of the EMC build material 12.

The EMC build material 12 may also include a flame retardant. The flame retardant may reduce or prevent flammability and improve the 3D printer part's shelf life. Examples of suitable flame retardants include halogens (such as bromine), $Sb_2O_3$, metal hydroxides, etc. The amount of the flame retardant present in the EMC build material 12 may range from about 1 wt % to about 15 wt % based on the total wt % of the EMC build material 12.

The EMC build material 12 may also include an adhesion promoter. The adhesion promoter may promote the adhesion of the melting epoxy resin with the filler and other EMC build material components. Examples of adhesion promoters include silane coupling agents. The amount of the adhesion promoter present in the EMC build material 12 may range from about 0 wt % to about 2 wt % based on the total wt % of the EMC build material 12.

The EMC build material 12 may also include a stress reliever. The stress reliever may be used to reduce the amount of stress, such as thermal stress or thermomechanical shrinkage stress, in the 3D printed part 38. Examples of suitable stress relievers include silicone, acrylonitrile-butadiene rubbers, and polybutylacrylate. The amount of the stress reliever present in the EMC build material 12 may range from about 0 wt % to about 10 wt % based on the total wt % of the EMC build material 12.

Some examples of commercially available EMC build materials 12 that may be used in the example method 100 disclosed herein include those available from SolEpoxy, such as the NB-series, OP-series, C-series, G-series, and OL-series.

While not shown in FIG. 1, the method 100 may further include preparing the EMC build material 12. In one example, the EMC build material 12 may be prepared by grinding an EMC build material precursor in liquid nitrogen (to keep the EMC build material precursor brittle and cool). Any suitable grinding machine may be used, such as a mill or food processor. The ground EMC build material precursor may then be sorted by size, in order to obtain the EMC build material 12. In an example, the ground EMC build material precursor may be sieved using a filter that is suitably sized to sort out particles that are suitably sized for the 3D printing process disclosed herein. The filter may be any suitable μm sized filter. In one example, the filter is a 75 μm sized filter. In another example, the filter is a stainless steel μm sized filter. In still another example, a double filter system is used to select/sort out particles of the ground EMC build material precursor having a particle size ranging from about 75 μm to about 20 μm for the 3D printing application.

Grinding and sorting/filtering may be used to reduce the particle size of the EMC build material precursor in order obtain the EMC build material 12 with a particle size that is suitable for 3D printing. For the 3D printing method 100 disclosed herein, the EMC build material 12 may be made up of similarly sized particles or differently sized particles. In the examples shown herein, the EMC build material 12 includes similarly sized particles. The term "size", as used herein with regard to the EMC build material 12, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the EMC build material 12 may be greater than 1 μm and may be up to about 100 μm. Substantially spherical particles of this particle size have good flowability and can be spread relatively easily. As another example, the average size of the particles of the EMC build material 12 ranges from about 10 μm to about 100 μm. As still another example, the average size of the particles of the EMC build material 12 is less than 75 μm, and may range from about 20 μm to about 60 μm.

Both the EMC build material precursor and the EMC build material 12 may have a finite shelf life. To extend the shelf life of the EMC build material precursor and the EMC build material 12, both may be stored at a temperature ranging from about 0° C. to about −20° C.

It is to be understood that that the temperature at which the EMC build material 12 sets/cures/fuses (i.e., the final temperature) may be dependent on the EMC build material 12 used. The EMC build material 12 may set/cure/fuse at a temperature ranging from about 100° C. to about 130° C. As an example, the EMC build material 12 may set/cure/fuse at about 110° C.

In the example shown at reference numeral 102, applying the EMC build material 12 includes the use of the printing system 10. The printing system 10 may include a supply bed 16 (including a supply of the EMC build material 12), a delivery piston 18, a spreader or build material distributor 20 (an example of which is the roller shown in FIG. 1), a fabrication bed 22 (having a contact surface 23), and a fabrication piston 24. Each of these physical elements may be operatively connected to a central processing unit (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 38. The data for the selective delivery of the EMC build material 12, the fusing agent 26, etc. may be derived from a model of the 3D part 38 to be formed. For example, the instructions may cause the controller to utilize the build material distributor to dispense the EMC build material 12.

The delivery piston 18 and the fabrication piston 24 may be the same type of piston, but are programmed to move in opposite directions. In an example, when a layer of the 3D part 38 is to be formed, the delivery piston 18 may be programmed to push a predetermined amount of the EMC build material 12 out of the opening in the supply bed 16 and the fabrication piston 24 may be programmed to move in the opposite direction of the delivery piston 18 in order to increase the depth of the fabrication bed 22. The delivery piston 18 will advance enough so that when the spreader 20 pushes the EMC build material 12 into the fabrication bed 22 and onto the contact surface 23, the depth of the fabrication bed 22 is sufficient so that a layer 14 of the EMC build material 12 may be formed in the fabrication bed 22. The spreader 20 is capable of spreading the EMC build material 12 into the fabrication bed 22 to form the EMC build material layer 14, which is relatively uniform in thickness. In an example, the thickness of the EMC build material layer 14 ranges from about 20 μm to about 70 μm, although thinner or thicker layers may also be used. For example, the thickness of the layer 14 may range from about 50 μm to about 1000 μm. Depending upon the desired thickness for the layer 14 and the particle size of the EMC build material 12, the layer 14 that is formed in a single build material application may be made up of a single row of EMC build material particles 12 or several rows of EMC build material particles 12 (as shown at reference numeral 102).

The spreader shown 30 is a roller. It is to be understood that the spreader 20 may be replaced by other tools, such as a rigid or flexible blade that may be useful for spreading different types of powders, or a combination of a roller and a blade. The EMC build material 12 may also be sprayed onto the fabrication bed 22 or other support member. The EMC build material 12 may be sprayed using an extrusion coater.

The supply bed 16 that is shown is one example, and could be replaced with another suitable delivery system to supply the EMC build material 12 to the fabrication bed 22. Examples of other suitable delivery systems include a hopper, an auger conveyer, or the like.

The fabrication bed 22 that is shown is also one example, and could be replaced with another support member, such as a platen, a print bed, a glass plate, or another build surface. Like the fabrication bed 22 and the fabrication piston 24, these other support members may be lowered in precise increments in order to receive the EMC build material 12 in a desirable thickness.

As shown at reference numeral 104 in FIG. 1, the layer 14 of the EMC build material 12 may be exposed to heating after the layer 14 is applied in the fabrication bed 22 (and prior to selectively applying the fusing agent 26). Heating is performed to pre-heat the EMC build material 12, and thus the heating temperature may be below the final temperature (i.e., the temperature at which the EMC build material 12 will set/cure/fuse). As such, the pre-heating temperature selected will depend upon the EMC build material 12 that is used. As examples, the heating temperature may be from about 5° C. to about 50° C. below the setting/curing/fusing point of the EMC build material 12. In another example, the pre-heating temperature may be 20° C. below the setting/curing/fusing point of the EMC build material 12. In some examples, the pre-heating temperature ranges from about 80° C. to about 100° C. In other examples, the heating temperature is about 90° C. At the pre-heating temperature that is used, the EMC build material 12 is still in powder form.

Pre-heating the layer 14 of the EMC build material 12 may be accomplished using any suitable heat source that exposes all of the EMC build material 12 in the fabrication bed 22 to the heat. Examples of the heat source include a thermal heat source (e.g., a heater (not shown) of the fabrication bed 22) or an electromagnetic radiation source (e.g., infrared (IR), microwave, etc.).

After the EMC build material 12 is applied at reference numeral 102 and/or after the EMC build material 12 is pre-heated at reference numeral 104, the fusing agent 26 is selectively applied on at least a portion 30 of the EMC build material 12, in the layer 14, as shown at reference number 106.

The fusing agent 26 may be dispensed from any suitable applicator. As illustrated in FIG. 1 at reference number 106, the fusing agent 26 may be dispensed from an inkjet printhead 28, such as a thermal inkjet printhead or a piezoelectric inkjet printhead. The printhead 28 may be a drop-on-demand printhead or a continuous drop printhead. The applicator(s) 28 selectively applies the fusing agent 26 on those portions 30 of the EMC build material 12 from which the 3D part 38 is to be formed. The fusing agent 26 is not applied on the portions 32. As such, EMC build material 12 in those portions 32 does not set/cure/fuse to become the 3D part 38.

The applicator 28 may be selected to deliver drops of the fusing agent 26 at a resolution ranging from about 300 dots per inch (DPI) to about 1200 DPI. In other examples, the applicator 28 may be selected to be able to deliver drops of the fusing agent 26 at a higher or lower resolution. The drop velocity may range from about 5 m/s to about 24 m/s and the firing frequency may range from about 1 kHz to about 100 kHz. The applicator 28 may include an array of nozzles through which it is able to selectively eject drops of fluid. In one example, each drop may be in the order of about 10 pico liters (pl) per drop, although it is contemplated that a higher or lower drop size may be used. In some examples, applicator 28 is able to deliver variable size drops of the fusing agent 26.

The applicator(s) 28 may be attached to a moving XY stage or a translational carriage (neither of which is shown) that moves the applicator (s) 28 adjacent to the contact surface 23 of the fabrication bed 22 in order to deposit the fusing agent 26 in desirable area(s) 30. In other examples, the applicator(s) 28 may be fixed while a support member (supporting the build surface) is configured to move relative thereto.

In an example, the applicator(s) 28 may have a length that enables it to span the whole width of the fabrication bed 22 in a page-wide array configuration. As used herein, the term 'width' generally denotes the shortest dimension in the plane parallel to the X and Y axes of the fabrication bed 22, and the term 'length' denotes the longest dimension in this plane. However, it is to be understood that in other examples the term 'width' may be interchangeable with the term 'length'. In an example, the page-wide array configuration is achieved through a suitable arrangement of multiple applicators 28. In another example, the page-wide array configuration is achieved through a single applicator 28. In this other example, the single applicator 28 may include an array of nozzles having a length to enable them to span the width of the fabrication bed 22. This configuration may be desirable for single pass printing. In still other examples, the applicator(s) 28 may have a shorter length that does not enable them to span the whole width of the fabrication bed 22. In these other examples, the applicator(s) 28 may be movable bi-directionally across the width of the fabrication bed 22. This configuration enables selective delivery of the fusing agent 26 across the whole width and length of the fabrication bed 22 using multiple passes.

The applicator(s) 28 may be programmed to receive commands from the central processing unit and to deposit the fusing agent 26 according to a pattern of a cross-section for the layer of the 3D part 38 that is to be formed. As used herein, the cross-section of the layer of the part 38 to be formed refers to the cross-section that is parallel to the contact surface 23. In the example shown in FIG. 1 at reference numeral 106, the applicator 28 selectively applies the fusing agent 26 on those portion(s) 30 of the layer 14 that are to be set/cured/fused to become the first layer of the 3D part 38. As an example, if the first layer is to be shaped like a cube or cylinder, the fusing agent 26 will be deposited in a square pattern or a circular pattern (from a top view), respectively, on at least a portion of the layer 14 of the EMC build material 12. In the example shown in FIG. 1 at reference numeral 106, the fusing agent 26 is deposited in a square pattern on the portion 30 of the layer 14 and not on the portions 32.

The fusing agent 26 may be a water-based dispersion including a radiation absorbing binding agent (i.e., the active material). In some instances, the fusing agent 26 consists of water and the active material. In other instances, the fusing agent 26 may further include dispersing agent(s), co-solvent(s), surfactant(s), antimicrobial agent(s), anti-kogation agent(s), chelating agent(s), and combinations thereof.

The fusing agent 26 is able to penetrate, at least partially, into the layer 14 of the EMC build material 12.

The active material in the fusing agent 26 may be any suitable material that absorbs electromagnetic radiation having a frequency ranging from about 3 GHz to about 30 PHz. Examples of the active material include infrared absorbers and/or microwave radiation-absorbing susceptors, such as carbon black, carbon fibers, graphite, spherical gold nanoparticles, or various iron oxides (e.g., magnetite).

The active material may also absorb radiation at other frequencies and wavelengths. As examples, the active material may be capable of absorbing IR radiation (i.e., a wavelength of about 700 nm to about 1 mm, which includes near-IR radiation (i.e., a wavelength of 700 nm to 1.4 μm)), ultraviolet radiation (i.e., a wavelength of about 10 nm to about 390 nm), visible radiation (i.e., a wavelength from about 390 nm to about 700 nm), or a combination thereof, instead of or in addition to microwave radiation (i.e., a wavelength of about 1 mm to 1 about m) and/or radio radiation (i.e., a wavelength from about 1 m to about 1000 m).

As one example, the fusing agent 26 may be an ink-type formulation including carbon black, such as, for example, the ink formulation commercially known as CM997A available from HP Inc. Within the fusing agent 26, the carbon black may be polymerically dispersed. The carbon black pigment may also be self-dispersed within the fusing agent 26 (e.g., by chemically modifying the surface of the carbon black).

Examples of suitable carbon black pigments that may be included in the fusing agent 26 include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

Examples of inks including visible light enhancers are dye based colored ink and pigment based colored ink, such as the commercially available inks CE039A and CE042A, available from HP Inc.

As mentioned above, the carbon black pigment may be polymerically dispersed within the fusing agent 26 by a polymeric dispersant having a weight average molecular weight ranging from about 12,000 to about 20,000. In this example, the fusing agent 26 includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the fusing agent 26, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the active material that is present in the fusing agent 26 ranges from greater than 0 wt % to about 40 wt % based on the total wt % of the fusing agent 26. In other examples, the amount of the active material in the fusing agent 26 ranges from about 0.3 wt % to 30 wt %, or from about 1 wt % to about 20 wt %. It is believed that these active material loadings provide a balance between the fusing agent 26 having jetting reliability and heat and/or electromagnetic radiation absorbance efficiency.

As used herein, "liquid vehicle," and "vehicle" may refer to the liquid fluid in which the active material is placed to form the fusing agent 26. As mentioned above, in addition to water, the vehicle may include co-solvent(s), surfactant(s), antimicrobial agent(s), anti-kogation agent(s), chelating agent(s), and combinations thereof.

The water-based vehicle may include an organic co-solvent. The co-solvent(s) may be used to improve reliability, nozzle health, and decap performance (i.e., the ability of the fluid to readily eject from a printhead, upon prolonged exposure to air). The co-solvent(s) may be present, in total in the fusing agent 26, in an amount ranging from about 1 wt % to about 50 wt % (based on the total wt % of the fusing agent 26), depending, at least in part, on the jetting architecture. In an example, the co-solvent is present in the fusing agent 26 in an amount of about 10 wt % based on the total wt % of the fusing agent 26. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

The vehicle may also include surfactant(s). The surfactant(s) may be used so that the fusing agent 26 quickly wets the EMC build material 12. As an example, the fusing agent 26 may include non-ionic, cationic, and/or anionic surfactants, which may be present in an amount ranging from about 0.01 wt % to about 5 wt % based on the total wt % of the fusing agent 26. In at least some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the fusing agent 26 may include a total amount of antimicrobial agents that ranges from about 0.1 wt % to about 0.25 wt %.

When the fusing agent 26 is to be applied via thermal inkjet applications, an anti-kogation agent may also be included in the vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the fusing agent 26 in an amount ranging from about 0.1 wt % to about 1 wt % of the total wt % of the fusing agent 26.

The vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the fusing agent 26 may range from 0 wt % to about 1 wt % based on the total wt % of the fusing agent 26.

The balance of the vehicle is water. As such, the amount of water may vary depending upon the weight percent of the other fusing agent components. In an example, the water is deionized water.

It is to be understood that a single fusing agent 26 may be selectively applied to form the layer of the 3D part 38, or multiple fusing agents 26 may be selectively applied to form the layer of the 3D part 38.

As shown at reference numeral 106, the method 100 may further include selectively applying a detailing agent 36 to other portions of the EMC build material 12. The detailing agent 36 may provide an evaporative cooling effect that reduces the temperature of the EMC build material 12 in contact with the detailing agent 36 during radiation exposure. It is to be understood that in some examples of the method 100 the detailing agent 36 is not applied.

The detailing agent 36 may be water alone. The detailing agent 36 may also include a surfactant, a co-solvent, and a balance of water. In some examples, the detailing agent 36 consists of these components, and no other components. In some instances, the detailing agent 36 further includes an anti-kogation agent, a biocide, or combinations thereof. The components of the detailing agent 36 may be similar to the surfactants, co-solvents, anti-kogation agents, and biocide described above in reference to the fusing agent 26. The detailing agent 36 may also include a colorant, but it is to be understood that this colorant does not absorb the radiation used for fusing.

The portions of the EMC build material 12 to which the detailing agent 36 is applied do not set/cure/fuse during the exposure of the EMC build material 12 to energy (shown at reference numeral 108). The detailing agent 36 may prevent the EMC build material 12 in contact with the detailing agent 36 from reaching the temperature necessary for the EMC build material 12 to set/cure/fuse. This may be due, in part, to the co-solvent and water of the detailing agent 36 providing evaporative cooling to the EMC build material 12 in proximity thereof (e.g., in thermal contact therewith). It is believed that, at least in some examples, evaporation of 1.3 milligrams per $cm^2$ of the detailing agent 36 can remove up to 3 Joules of energy per $cm^2$ of the build material 12. This energy loss is enough to keep the build material 12 from heating and fusing at those portion(s)/area(s) (e.g., reference numeral 42) where the detailing agent 36 is applied. In an example, the temperature of the EMC build material 12 that is in contact with the detailing agent 36 during radiation exposure may be at least 20° C. less than the temperature of the EMC build material 12 that is in contact with the fusing agent 26 during radiation exposure.

In one example, the other portions to which the detailing agent 36 is applied may be all of portions 32 which do not have the fusing agent 26 applied thereto. For example, the detailing agent 36 may be applied on all of the build material 12 outside of the edge boundary (i.e., the outermost portions where the fusing agent 26 is selectively deposited onto the build material 12 during 3D printing) of the 3D part 32 during its formation. In another example, the other portion(s) 32 to which the detailing agent 36 is applied may be less than all of portions 32 which do not have the fusing agent 26 applied thereto. In this example, the detailing agent 36 may be applied on the outside edge of the boundary of the portion(s) 30 and not on the rest of the portion(s) 32.

In still other examples, it may be desirable to utilize the detailing agent 36 when the EMC build material 12 has a colorant therein. The build material colorant may be a radiation absorber, and the use of the detailing agent 36 may keep the non-patterned patterned EMC build material 12 (i.e., which does not have the fusing agent 26 thereon) from heating to the final (e.g., curing/fusing) temperature.

The detailing agent 36 may be selectively applied using any suitable applicator, such as applicator 28' shown at reference numeral 106. The applicator 28' may be any of the applicators described above in relation to the applicator 28 (which is used to apply the fusing agent 26 at reference numeral 106 in FIG. 1). The applicator 28' may also function (e.g., move, receive commands from the central processing unit, etc.) and have the same dimensions (e.g., length and width) as the applicator 28 described above.

After the fusing agent 26 is selectively applied in the desired portion(s) 30 and/or the detailing agent 36 is selectively applied to other portion(s) (e.g., portions 32), the entire layer 14 of the EMC build material 12 (including the fusing agent 26 applied to at least a portion thereof) is exposed to energy. This is shown at reference numeral 108 of FIG. 1.

The energy is emitted from an energy source 34. The energy source 34 may be any source that emits electromagnetic radiation having a frequency ranging from about 3 GHz to about 30 PHz. Examples of suitable energy sources 34 include a UV, IR or near-IR curing lamp, or UV, IR or near-IR light emitting diodes (LED), lasers with specific UV, IR or near-IR wavelengths, visible light sources, microwave generators, radars, or the like, a microwave or RF furnace, a magnetron that emits microwaves, antenna structures that emit RF energy, etc.

The energy source 34 may be attached, for example, to a carriage that also holds the inkjet applicator(s) 28, 28'. The carriage may move the energy source 34 into a position that is adjacent to the fabrication bed 22. The energy source 34 may also be fixed above the fabrication bed 22. Other examples of the energy source 34 may require that the entire layer 14 of the EMC build material 12 be removed from the fabrication bed 22 and positioned within the source 34.

The energy source 34 may be programmed to receive commands from the central processing unit and to expose the layer 14, including the fusing agent 26 and EMC build material 12, to the energy having the frequency ranging from about 3 GHz to about 30 PHz.

The energy exposure time may be dependent on the characteristics of the energy source 34 chosen, the characteristics of the fusing agent 26 used and/or the characteristics of the EMC build material 12. In an example, the patterned EMC build material 12 may be sufficiently cured (i.e., so that cured regions can be separated from non-cured regions) within a time ranging from about 10 seconds to about 1 minute. Longer times may be used to ensure curing.

The fusing agent 26 enhances the absorption of the energy, converts the absorbed energy to thermal energy, and promotes the transfer of the thermal heat to the EMC build material 12 in contact therewith (i.e., in the portion(s) 30). In an example, the fusing agent 26 sufficiently elevates the temperature of the EMC build material 12 above the melting point(s), allowing curing (e.g., sintering, binding, fusing, etc.) of the EMC build material 12 in contact with the fusing agent 26 to take place. In an example, the temperature is elevated to a final temperature of about 110° C. and the EMC build material 12 sets/cures/fuses. It is to be understood that that the final temperature, i.e., the temperature at which the EMC build material 12 sets/cures/fuses, may be dependent on the EMC build material 12 used. It is also to be understood that portions 32 of the EMC build material 12 that do not have the fusing agent 26 applied thereto (and which may or may not have the detailing agent 36 applied thereto) do not absorb enough energy to set/cure/fuse. Exposure to energy forms the 3D layer or part 38, as shown at reference numeral 108 in FIG. 1.

While the 3D part 38 is shown as a single layer, it is to be understood that the 3D part 38 may include several layers. Each additional layer of the 3D part 38 may be formed by repeating reference numerals 102-108. For example, to form an additional layer of the 3D part 38, an additional layer of the EMC build material 12 may be applied to the 3D part 38 shown in reference numeral 108 and the additional layer may be preheated, may have the fusing agent 26 selectively applied thereto, and may be exposed to energy to form that additional layer. Any number of additional layers may be formed. When the 3D object 38 is complete, it may be removed from the fabrication bed 22, and any unset/uncured/unfused EMC build material 12 may be removed, and in some instances reused.

Figure 2:
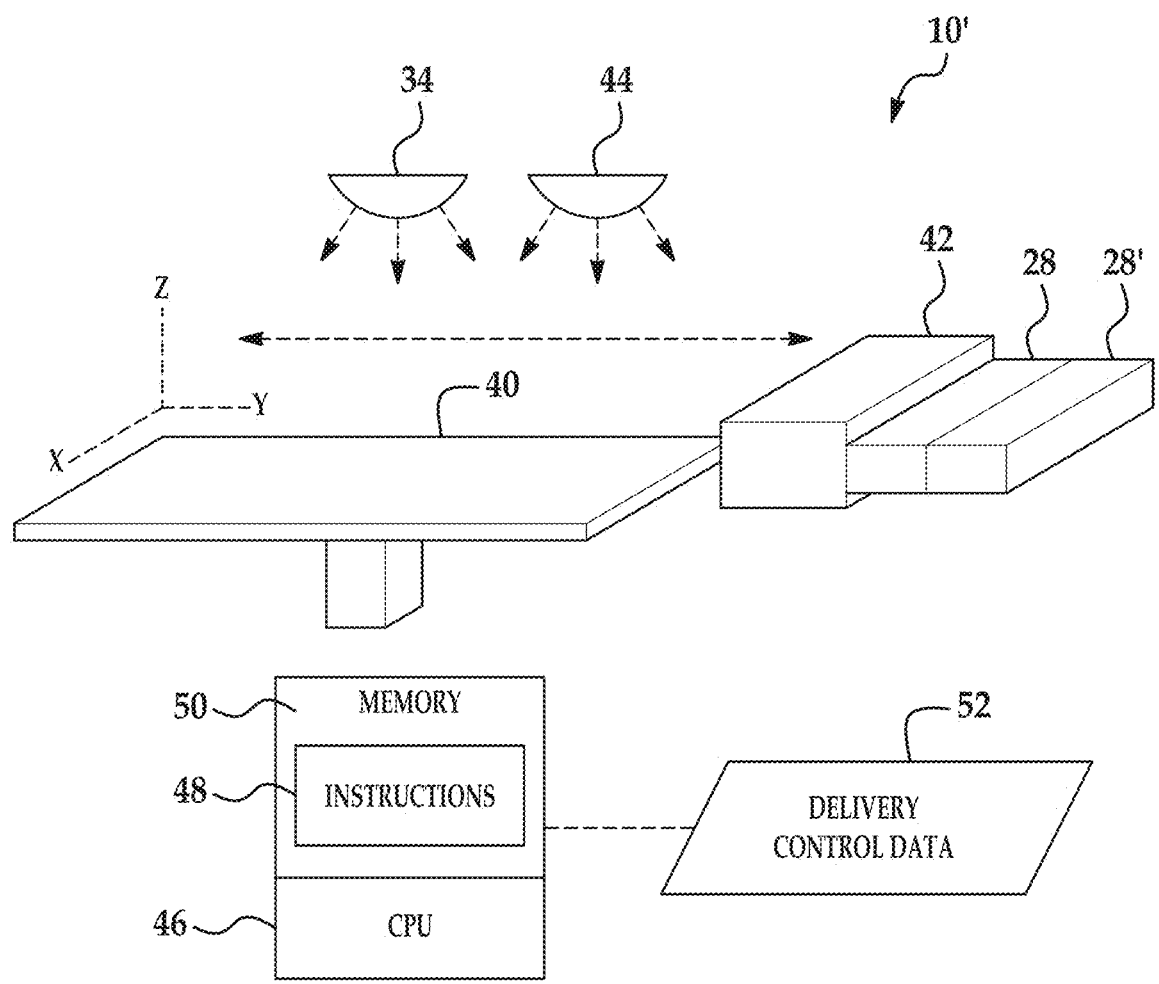
FIG. 2 is a simplified isometric view of an example of a 3D printing system disclosed herein.

Referring now to FIG. 2, another example of the printing system 10' is depicted. The system 10' includes a central processing unit 46 that controls the general operation of the additive printing system 10'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10' in accordance with the instructions 48. For example, the instructions 48 may cause the controller to utilize a build material distributor 42 to dispense the EMC build material 12, and to utilize fusing agent distributor 28 (e.g., inkjet applicator 28) to selectively dispense the fusing agent 26 to form a three-dimensional part 38.

In this example, the printing system 10' includes a fusing agent distributor 28 to selectively deliver fusing agent 26 to portion(s) 30 of the layer (not shown in this figure) of EMC build material 12 provided on a support member 40. In this example, the printing system 10' also includes a detailing agent distributor 28' (e.g., inkjet applicator 28') to selectively deliver the detailing agent 36 to other portion(s) of the layer of EMC build material 12 provided on the support member 40.

The central processing unit 46 controls the selective delivery of the fusing agent 26 and the detailing agent 36 to the layer of the EMC build material 12 in accordance with delivery control data 52.

In the example shown in FIG. 2, it is to be understood that the distributors 28, 28' are printheads, such as thermal printheads or piezoelectric inkjet printheads. The printheads 28, 28' may be a drop-on-demand printheads or a continuous drop printheads.

The applicators 28, 28' may be used to selectively deliver the fusing agent 26 and the detailing agent 36, respectively, when in the form of a suitable fluid. As described above, both the fusing agent 26 and the detailing agent 36 include an aqueous or non-aqueous vehicle, such as water, co-solvent(s), surfactant(s), etc., to enable them to be delivered via the applicators 28, 28'.

In one example the applicators 28, 28' may be selected to deliver drops of the fusing agent 26 and the detailing agent 36 at a resolution ranging from about 300 dots per inch (DPI) to about 1200 DPI. In other examples, the applicators 28, 28' may be selected to be able to deliver drops of the fusing agent 26 and the detailing agent 36 at a higher or lower resolution. The drop velocity may range from about 5 m/s to about 24 m/s and the firing frequency may range from about 1 kHz to about 100 kHz.

Each applicators 28, 28' may include an array of nozzles through which the applicators 28, 28' are able to selectively eject drops of fluid. In one example, each drop may be in the order of about 10 pico liters (pl) per drop, although it is contemplated that a higher or lower drop size may be used. In some examples, applicators 28, 28' are able to deliver variable size drops.

The applicators 28, 28' may be an integral part of the printing system 10', or they may be user replaceable. When the applicators 28, 28' are user replaceable, they may be removably insertable into a suitable distributor receiver or interface module (not shown).

In another example of the printing system 10', a single inkjet printhead may be used to selectively deliver both the fusing agent 26 and the detailing agent 36. For example, a first set of printhead nozzles of the printhead may be configured to deliver the fusing agent 26, and a second set of printhead nozzles of the printhead may be configured to deliver the detailing agent 36.

As shown in FIG. 2, each of the distributors 28, 28' may have a length that enables it to span the whole width of the support member 40 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 40. In other examples of the printing system 10', the distributors 28, 28' may have a shorter length that does not enable it to span the whole width of the support member 40.

While not shown in FIG. 2, it is to be understood that the distributors 28, 28' may be mounted on a moveable carriage to enable them to move bi-directionally across the length of the support member 40 along the illustrated y-axis. This enables selective delivery of the fusing agent 26 and the detailing agent 36 across the whole width and length of the support member 40 in a single pass. In other examples, the distributors 28, 28' may be fixed while the support member 40 is configured to move relative thereto.

As used herein, the term 'width' generally denotes the shortest dimension in the plane parallel to the X and Y axes shown in FIG. 2, and the term 'length' denotes the longest dimension in this plane. However, it is to be understood that in other examples the term 'width' may be interchangeable with the term 'length'. As an example, the distributors 28, 28' may have a length that enables them to span the whole length of the support member 40 while the moveable carriage may move bi-directionally across the width of the support member 40.

In examples in which the distributors 28, 28' have a shorter length that does not enable them to span the whole width of the support member 40, the distributors 28, 28' may also be movable bi-directionally across the width of the support member 40 in the illustrated X axis. This configuration enables selective delivery of the fusing agent 26 and detailing agent 36 across the whole width and length of the support member 40 using multiple passes.

The distributors 28, 28' may respectively include therein a supply of the fusing agent 26 and the detailing agent 36 or may be respectively operatively connected to a separate supply of the fusing agent 26 and the detailing agent 36.

As shown in FIG. 2, the printing system 10' also includes a build material distributor 42. This distributor 42 is used to provide the layer (e.g., layer 14) of the EMC build material 12 on the support member 40. Suitable build material distributors 42 may include, for example, a spraying mechanism, a wiper blade, a roller, or combinations thereof.

The EMC build material 12 may be supplied to the build material distributor 42 from a hopper or other suitable delivery system. In the example shown, the build material distributor 42 moves across the length (Y axis) of the support member 40 to deposit a layer of the EMC build material 12. As previously described, a first layer of EMC build material 12 will be deposited on the support member 40, whereas subsequent layers of the EMC build material 12 will be deposited on a previously deposited (and solidified) layer (e.g., layer 38).

It is to be further understood that the support member 40 may also be moveable along the Z axis. In an example, the support member 40 is moved in the Z direction such that as new layers of EMC build material 12 are deposited, a predetermined gap is maintained between the surface of the most recently formed layer and the lower surface of the distributors 28, 28'. In other examples, however, the support member 40 may be fixed along the Z axis and the distributors 28, 28' may be movable along the Z axis.

Similar to the system 10 (shown in FIG. 1), the system 10' also includes the energy source 34 to apply energy to the deposited layer of EMC build material 12 and the fusing agent 26 to cause the solidification of portion(s) 30 of the EMC build material 12. Any of the previously described energy sources 34 may be used. In an example, the energy source 34 is a single energy source that is able to uniformly apply energy to the deposited materials, and in another example, energy source 34 includes an array of energy sources to uniformly apply energy to the deposited materials.

In the examples disclosed herein, the energy source 34 is configured to apply energy in a substantially uniform manner to the whole surface of the deposited EMC build material 12. This type of energy source 34 may be referred to as an unfocused energy source. Exposing the entire layer to energy simultaneously may help increase the speed at which a three-dimensional object may be generated.

While not shown, it is to be understood that the energy source 34 may be mounted on the moveable carriage or may be in a fixed position.

The central processing unit 46 may control the energy source 34. The amount of energy applied may be in accordance with delivery control data 52.

The system 10' may also include a pre-heater 44 that is used to pre-heat the deposited EMC build material 12 (as shown and described in reference to FIG. 1 at reference numeral 104). The use of the pre-heater 44 may help reduce the amount of energy that has to be applied by the energy source 34.

To further illustrate the present disclosure, an example is given herein. It is to be understood that this example is provided for illustrative purposes and is not to be construed as limiting the scope of the present disclosure.

EXAMPLE

An example of the EMC build material was prepared from an EMC build material precursor. The EMC build material precursor used in this example was SOLO® NB2912-24A (manufactured by SolEpoxy). The EMC build material precursor was mixed with liquid nitrogen to keep the EMC build material precursor brittle and cool during the grinding process. The EMC build material precursor was then ground with a commercial grade food processor for about 2 to about 3 minutes. After grinding, the EMC build material precursor was sieved with a 75 μm sized stainless steel filter.

The EMC build material was sprayed onto the build surface using a 1 mm thick recessed metal plate.

A fusing agent was dispensed onto the EMC build material using a thermal inkjet picofluidic system (TIPS) pen. The active material used in the fusing agent was carbon black. The fusing agent was dispensed in the shape of a rhomboid.

Figure 3:
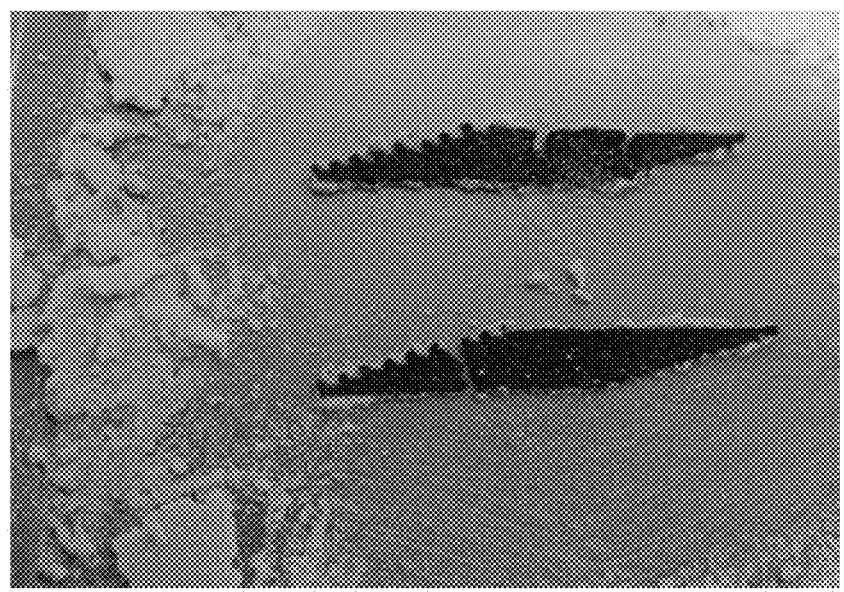
FIG. 3 is a photographic image of 3D printed parts formed by an example of the 3D printing method disclosed herein.

An infrared (IR) heating lamp was used to set/cure/fuse the EMC build material. The IR heating lamp heated the EMC build material that was patterned with the fusing agent to about 110° C. The EMC build material was exposed to the IR heating lamp for about 10 seconds. The portion of the EMC build material that was not patterned with the fusing agent remained unset/uncured/unfused. The unset/uncured/ unfused EMC build material powder was easily separated from the 3D printed parts with a brush. A black and white photographic image of the 3D printed parts after the unset/uncured/unfused EMC build material was brushed away is shown in FIG. 3.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 1 μm and up to about 100 μm should be interpreted to include the explicitly recited limits of greater than 1 μm to 100 μm, as well as individual values, such as 5 μm, 12.5 μm, 30 μm, 49 μm, etc., and sub-ranges, such as from about 25 μm to about 75 μm, from about 60 μm to about 95 μm, etc. Furthermore, when "about" is utilized to describe a value, this is meant to encompass minor variations (up to ±10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
applying a one part thermal cure epoxy mold compound build material;
selectively applying a fusing agent on at least a portion of the epoxy mold compound build material; and
exposing the epoxy mold compound build material to energy, thereby fusing the portion of the epoxy mold compound build material in contact with the fusing agent to form a layer.

2. The method as defined in claim 1 wherein the epoxy mold compound build material is a white powder.

3. The method as defined in claim 2, further comprising preparing the epoxy mold compound build material by grinding and sorting, by particle size, an epoxy mold compound build material precursor.

4. The method as defined in claim 3 wherein the grinding is accomplished in liquid nitrogen.

5. The method as defined in claim 2 wherein the epoxy mold compound build material includes a catalyst selected from the group consisting of a phosphorous catalyst, an amine catalyst, and an imidazole catalyst.

6. The method as defined in claim 1 wherein the epoxy mold compound build material is a thermal set material.

7. The method as defined in claim 1 wherein the applying of the epoxy mold compound build material is accomplished by spraying the epoxy mold compound build material.

8. The method as defined in claim 7 wherein the epoxy mold compound build material includes a melting epoxy resin and a non-melting filler, and wherein a ratio of melting epoxy resin to non-melting filler ranges from about 1 to about 10.

9. The method as defined in claim 8 wherein:
the melting epoxy resin is a cycloaliphatic epoxide; and
the non-melting filler is selected from the group consisting of silica, alumina, alumina nitride, quartz, and combinations thereof.

10. The method as defined in claim 1 wherein:
prior to selectively applying the fusing agent, the method further comprises heating the epoxy mold compound build material to a heating temperature ranging from about 80° C. to about 100° C.; and
the exposing of the epoxy mold compound build material to the energy raises a temperature of the portion of the epoxy mold compound build material in contact with the fusing agent to a final temperature ranging from about 100° C. to about 130° C.

11. The method as defined in claim 1, further comprising selectively applying a detailing agent to an other portion of the epoxy mold compound build material, wherein the other portion of the epoxy mold compound build material does not fuse during the exposing of the epoxy mold compound build material to energy.

12. The method as defined in claim 11 wherein:
the exposing of the epoxy mold compound build material to the energy raises a temperature of the portion of the epoxy mold compound build material in contact with the fusing agent to a final temperature; and
a temperature of the other portion of the epoxy mold compound during the exposure to the energy is at least 20° C. less than the final temperature.

13. The method as defined in claim 1 wherein the fusing agent includes a radiation absorber selected from the group consisting of carbon black, carbon fibers, graphite, iron oxides, and spherical gold nanoparticles.

14. The method as defined in claim 1, wherein the epoxy mold compound build material includes a silane coupling agent adhesion promoter.

15. The method as defined in claim 1, wherein the epoxy mold compound build material includes a mold release agent selected from the group consisting of a hydrocarbon wax, silicone, sodium dodecyl sulfate (SDS) soap, and a fatty acid.

16. The method as defined in claim 1 wherein the epoxy mold compound build material is applied without a hardener or curing agent.

17. A three-dimensional (3D) printing system, comprising:
a supply containing a one part thermal cure epoxy mold compound build material;
a build material distributor;
a supply of a fusing agent;
an inkjet applicator for selectively dispensing the fusing agent;
a controller; and
a non-transitory computer readable medium having stored thereon computer executable instructions to cause the controller to:
utilize the build material distributor to dispense the epoxy mold compound build material; and
utilize the inkjet applicator to selectively dispense the fusing agent to pattern a three-dimensional part layer.

18. The 3D printing system as defined in claim 17, further comprising:
a supply of a detailing agent; and
an other inkjet applicator for selectively dispensing the detailing agent;

wherein the computer executable instructions further cause the controller to utilize the other inkjet applicator to selectively dispense the detailing agent.

19. The 3D printing system as defined in claim 17 wherein the epoxy mold compound build material is a white powder including a melting epoxy resin and a non-melting filler, and wherein a ratio of the melting epoxy resin to the non-melting filler ranges from about 1 to about 10.

* * * * *